US011288309B2

(12) United States Patent
Zhu et al.

(10) Patent No.: US 11,288,309 B2
(45) Date of Patent: Mar. 29, 2022

(54) METHOD, SERVER, AND STORAGE MEDIUM FOR MELODY INFORMATION PROCESSING

(71) Applicant: TENCENT TECHNOLOGY (SHENZHEN) COMPANY LIMITED, Shenzhen (CN)

(72) Inventors: Bilei Zhu, Shenzhen (CN); Fangmai Zheng, Shenzhen (CN); Xingming Jin, Shenzhen (CN); Ke Li, Shenzhen (CN); Yongjian Wu, Shenzhen (CN); Feiyue Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 704 days.

(21) Appl. No.: 15/951,219

(22) Filed: Apr. 12, 2018

(65) Prior Publication Data

US 2018/0232446 A1 Aug. 16, 2018

Related U.S. Application Data

(63) Continuation of application No. PCT/CN2017/074315, filed on Feb. 21, 2017.

(30) Foreign Application Priority Data

Mar. 18, 2016 (CN) .......................... 201610158349.7

(51) Int. Cl.
*G06F 16/632* (2019.01)
*G06F 16/61* (2019.01)
(Continued)

(52) U.S. Cl.
CPC .............. *G06F 16/634* (2019.01); *G06F 3/16* (2013.01); *G06F 16/00* (2019.01); *G06F 16/61* (2019.01); *G06F 16/683* (2019.01); *G10L 25/90* (2013.01)

(58) Field of Classification Search
CPC ........ G06F 16/634; G06F 16/61; G06F 16/00; G06F 16/683
See application file for complete search history.

(56) References Cited

U.S. PATENT DOCUMENTS

| 6,549,767 | B1 * | 4/2003 | Kawashima | ........ | H04M 1/7243 |
| | | | | | 455/412.2 |
| 2007/0131094 | A1 * | 6/2007 | Kemp | ................... | G06F 16/632 |
| | | | | | 707/E17.101 |

(Continued)

FOREIGN PATENT DOCUMENTS

| CN | 1737797 A | 2/2006 |
| CN | 1750117 A | 3/2006 |

(Continued)

OTHER PUBLICATIONS

International Search Report dated Apr. 26, 2017 issued in PCT/CN2017/074315 with English translation, 5 pages.

(Continued)

*Primary Examiner* — Kannan Shanmugasundaram
(74) *Attorney, Agent, or Firm* — Oblon, McClelland, Maier & Neustadt, L.L.P.

(57) ABSTRACT

A melody information processing method is described. A piece of Musical Instrument Digital Interface (MIDI) data corresponding to a song is received, a song identifier of the song is obtained, first melody information is generated according to the MIDI data, and the first melody information is stored in association with the song identifier in a melody database. Moreover, a user unaccompanied-singing audio data set that is uploaded from a user terminal is received, (Continued)

second melody information corresponding to the song identifier is extracted according to the user unaccompanied-singing audio data set, and the second melody information is stored in association with the song identifier in the melody database.

18 Claims, 6 Drawing Sheets

(51) Int. Cl.
*G06F 16/683* (2019.01)
*G06F 16/00* (2019.01)
*G06F 3/16* (2006.01)
*G10L 25/90* (2013.01)

(56) References Cited

U.S. PATENT DOCUMENTS

| | | | |
|---|---|---|---|
| 2008/0082507 A1* | 4/2008 | Tarantino | G06F 16/3331 707/999.003 |
| 2010/0030758 A1 | 2/2010 | Belknap et al. | |
| 2010/0211693 A1* | 8/2010 | Master | G06F 16/683 707/E17.014 |
| 2013/0132387 A1 | 5/2013 | Nagasaka et al. | |
| 2018/0232446 A1 | 8/2018 | Zhu et al. | |

FOREIGN PATENT DOCUMENTS

| | | |
|---|---|---|
| CN | 102522083 A | 6/2012 |
| CN | 103440250 A | 12/2013 |
| CN | 107203571 A | 9/2017 |
| CN | 107203571 B | 8/2019 |
| JP | 200175985 A | 2/2001 |
| JP | 2008-516289 | 5/2008 |
| JP | 2009015535 A | 1/2009 |
| JP | 200963854 A | 3/2009 |
| JP | 2019-507912 A | 3/2019 |
| KR | 2018-0088889 A | 8/2018 |

OTHER PUBLICATIONS

Concise explanation of Chinese Office Action dated Dec. 28, 2018 in CN application No. 201610158349.7, filed Feb. 5, 2019, 2 pages.
Chinese Office Action dated Mar. 18, 2019 in CN application No. 201610158349.7, with Concise explanation of relevance, 8 pages.
Japanese Office Action dated Jul. 29, 2019 in Japanese Patent Application No. 2018-552111 with English Summary, 8 pages.
Office Action dated Sep. 26, 2019 in Indonesian Patent Application No. P00201804770.
Japanese Office Action dated Mar. 9, 2020 in Japanese Application No. 2018-552111, with English translation.
Chinese Office Action dated Dec. 28, 2018 in CN application No. 201610158349.7, 10 pages.
Written Opinion of the ISR dated Apr. 26, 2017 for PCT/CN2017/074315 with English translation, 7 pages.
PCT International Preliminary Report on Patentability dated Sep. 18, 2018 in PCT/CN2017/074315 with English translation, 4 pages.

* cited by examiner

METHOD, SERVER, AND STORAGE MEDIUM FOR MELODY INFORMATION PROCESSING

RELATED APPLICATION

This application is a continuation of International Application No. PCT/CN2017/074315, filed on Feb. 21, 2017, which claims priority to Chinese Patent Application No. 201610158349.7, filed on Mar. 18, 2016 and entitled "SONG MELODY INFORMATION PROCESSING METHOD AND APPARATUS." The entire disclosures of the prior applications are hereby incorporated by reference herein in their entirety.

FIELD OF THE TECHNOLOGY

This application relates to the field of audio processing technologies.

BACKGROUND OF THE DISCLOSURE

Humming recognition is an application of audio processing technologies. For example, song information corresponding to a recording of a melody hummed by a user can be obtained by searching matched melody information stored in a melody database. In many applications, implementing a humming recognition technology relies on a resourceful melody database.

In some examples, a melody database is set up entirely by using Musical Instrument Digital Interface (MIDI) data. However, the MIDI data are normally generated by music professionals using dedicated devices, and thus can be very costly. A typical humming recognition system may incorporate a melody database that includes millions of pieces of melody information. Consequently, costs of setting up a melody database for humming recognition can be excessively high, which restricts the application and development of the humming recognition technology.

SUMMARY

Aspects of the disclosure provide a melody information processing method. A piece of Musical Instrument Digital Interface (MIDI) data corresponding to a song is received by a server device, a song identifier of the song is obtained, first melody information is generated by the processing circuitry of the server device according to the MIDI data, and the first melody information is stored in association with the song identifier in a melody database. Moreover, a user unaccompanied-singing audio data set that is uploaded from a user terminal is received by the server device, second melody information corresponding to the song identifier is extracted by the processing circuitry of the server device according to the user unaccompanied-singing audio data set, and the second melody information is stored in association with the song identifier in the melody database.

In an embodiment, before the second melody information corresponding to the song identifier is extracted, at least one of the following types of user unaccompanied-singing audio data from the user unaccompanied-singing audio data set is filtered out: a piece of user unaccompanied-singing audio data that corresponds to an incomplete rendition of a corresponding song; a piece of user unaccompanied-singing audio data that is identified as a rendition of a corresponding song recorded without using a headset for feeding corresponding instrumental accompaniment; and a piece of user unaccompanied-singing audio data that is determined to include noise or an instrumental accompaniment.

In an embodiment, for extracting the second melody information corresponding to the song identifier, a piece of user unaccompanied-singing audio data set that corresponds to the song identifier is traversed to obtain pitch information of the traversed piece of user unaccompanied-singing audio data, note onset detection is performed on the traversed piece of user unaccompanied-singing audio data to obtain note onset timing information corresponding to the obtained pitch information, and the pitch information and the corresponding note onset timing information are combined into the second melody information corresponding to the song identifier.

In an embodiment, for the note onset detection performed on the traversed piece of the user unaccompanied-singing audio data set to obtain the note onset timing information corresponding to the extracted pitch information, the traversed piece of the user unaccompanied-singing audio data set is divided into a plurality of frequency sub-bands by using a filter. Also, for each frequency sub-band, an amplitude contour is extracted, a first-order relative difference function is calculated based on the amplitude contour, a local maximum value of the first-order relative difference function is extracted as a note onset component, and time and intensity of the note onset component are estimated. Moreover, a final note onset time is determined based on time and intensity of note onset components of the different frequency sub-bands.

In an embodiment, an audio data set used for providing a music service for the user terminal is obtained, third melody information corresponding to the song identifier is extracted according to the audio data set, and the third melody information is stored in association with the song identifier in the melody database.

In an embodiment, for extracting, according to the audio data set, the third melody information corresponding to the song identifier, a piece of the audio data set that corresponds to the song identifier is traversed to obtain a main-melody pitch contour of the traversed piece of song audio data, pitch values in the main-melody pitch contour within respective time intervals that are defined according to a fixed time length are merged to obtain a merged pitch information and corresponding note onset timing information, and the merged pitch information and the corresponding note onset timing information are combined into third melody information corresponding to the song identifier.

In an embodiment, a piece of to-be-recognized humming feature data is received, similarities between the piece of humming feature data and pieces of melody information in the melody database are determined, one or more pieces of melody information that correspond to the determined similarities greater than a preset similarity threshold are identified, one or more song identifiers corresponding to the identified one or more pieces of melody information are obtained, and a humming recognition result according to the obtained one or more song identifiers is generated.

Aspects of the disclosure provide a server including a processor. The processor is receives a piece of Musical Instrument Digital Interface (MIDI) data corresponding to a song; obtains a song identifier of the song, generate first melody information according to the MIDI data, and stores the first melody information in association with the song identifier in a melody database. The processor further receives a user unaccompanied-singing audio data set that is uploaded from a user terminal, extracts, according to the user unaccompanied-singing audio data set, second melody information corresponding to the song identifier, and stores the second melody information in association with the song identifier in the melody database.

In an embodiment, the processor further, before the second melody information corresponding to the song identifier is extracted, filters out at least one of the following types of user unaccompanied-singing audio data from the user unaccompanied-singing audio data set: a piece of user unaccompanied-singing audio data that corresponds to an incomplete rendition of a corresponding song; a piece of user unaccompanied-singing audio data that is identified as a rendition of a corresponding song recorded without using a headset for feeding corresponding instrumental accompaniment; and a piece of user unaccompanied-singing audio data that is determined to include noise or an instrumental accompaniment.

In an embodiment, the processor further traverses a piece of the user unaccompanied-singing audio data set that corresponds to the song identifier to obtain pitch information of the traversed piece of the user unaccompanied-singing audio data set, performs note onset detection on the traversed piece of the user unaccompanied-singing audio data set to obtain note onset timing information corresponding to the obtained pitch information, and combines the pitch information and the corresponding note onset timing information into the second melody information corresponding to the song identifier.

In an embodiment, the processor further divides the traversed piece of the user unaccompanied-singing audio data set into a plurality of frequency sub-bands by using a filter. The processor further, for each frequency sub-band, extract an amplitude contour, calculates a first-order relative difference function based on the amplitude contour, extracts a local maximum value of the first-order relative difference function as a note onset component, and estimates time and intensity of the note onset component. The processor further determines a final note onset time based on time and intensity of note onset components of the different frequency sub-bands.

In an embodiment, the processor further obtains an audio data set used for providing a music service for the user terminal, extracts, according to the audio data set, third melody information corresponding to the song identifier, and stores the third melody information in association with the song identifier in the melody database.

In an embodiment, the processor further traverses a piece of the audio data set that corresponds to the song identifier to obtain a main-melody pitch contour of the traversed piece of audio data, merges pitch values in the main-melody pitch contour within respective time intervals that are defined according to a fixed time length to obtain a merged pitch information and corresponding note onset timing information, and combines the merged pitch information and the corresponding note onset timing information into third melody information corresponding to the song identifier.

In an embodiment, further receives a piece of to-be-recognized humming feature data, determines similarities between the piece of humming feature data and pieces of melody information in the melody database, identifies one or more pieces of melody information that correspond to the determined similarities greater than a preset similarity threshold, obtaining one or more song identifiers corresponding to the identified one or more pieces of melody information, and generates a humming recognition result according to the obtained one or more song identifiers.

Aspects of the disclosure provide a non-transitory computer-readable storage medium storing computer-readable instructions, the computer-readable instructions, when executed by one or more processors, causing the one or more processors to perform at least the operations described herein. For example, a piece of Musical Instrument Digital Interface (MIDI) data corresponding to a song is received, a song identifier of the song is obtained, first melody information according to the MIDI data is generated, the first melody information is stored in association with the song identifier in a melody database. Moreover, a user unaccompanied-singing audio data set that is uploaded from a user terminal is received, second melody information corresponding to the song identifier is extracted according to the user unaccompanied-singing audio data set, and the second melody information is stored in association with the song identifier in the melody database.

In an embodiment, before the second melody information corresponding to the song identifier is extracted, at least one of the following types of user unaccompanied-singing audio data from the user unaccompanied-singing audio data set is filtered out: a piece of user unaccompanied-singing audio data that corresponds to an incomplete rendition of a corresponding song; a piece of user unaccompanied-singing audio data that is identified as a rendition of a corresponding song recorded without using a headset for feeding corresponding instrumental accompaniment; and a piece of user unaccompanied-singing audio data that is determined to include noise or an instrumental accompaniment.

In an embodiment, for extracting the second melody information corresponding to the song identifier, a piece of the user unaccompanied-singing audio data set that corresponds to the song identifier is traversed to obtain pitch information of the traversed piece of user unaccompanied-singing audio data, note onset detection on the traversed piece of user unaccompanied-singing audio data is performed to obtain note onset timing information corresponding to the obtained pitch information, and the pitch information and the corresponding note onset timing information are combined into second melody information corresponding to the song identifier.

In an embodiment, an audio data set used for providing a music service for the user terminal is obtained, third melody information corresponding to the song identifier is extracted according to the audio data set, and the third melody information is stored in association with the song identifier in the melody database.

In an embodiment, for extracting, according to the audio data set, the third melody information corresponding to the song identifier, a piece of the audio data set that corresponds to the song identifier is traversed to obtain a main-melody pitch contour of the traversed piece of song audio data, pitch values in the main-melody pitch contour within respective time intervals that are defined according to a fixed time length are merged to obtain a merged pitch information and corresponding note onset timing information, and the merged pitch information and the corresponding note onset timing information are combined into third melody information corresponding to the song identifier.

In an embodiment, a piece of to-be-recognized humming feature data is received, similarities between the piece of humming feature data and pieces of melody information in the melody database are determined, one or more pieces of melody information that correspond to the determined similarities greater than a preset similarity threshold are identified, one or more song identifiers corresponding to the identified one or more pieces of melody information are obtained, and a humming recognition result is generated according to the obtained one or more song identifiers.

Details of one or more embodiments of this application are provided in the following accompanying drawings and descriptions. Other features, objectives, and advantages of the present disclosure as understood by a person of ordinary skill in the art in view of the specification, the accompanying drawings, and the claims are within the scope of the present disclosure.

BRIEF DESCRIPTION OF THE DRAWINGS

To describe various embodiments of this application, the following briefly describes the accompanying drawings. The accompanying drawings in the following description show only some embodiments of this application, and a person of ordinary skill in the art may still derive other drawings from these accompanying drawings.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application.

Figure 1:
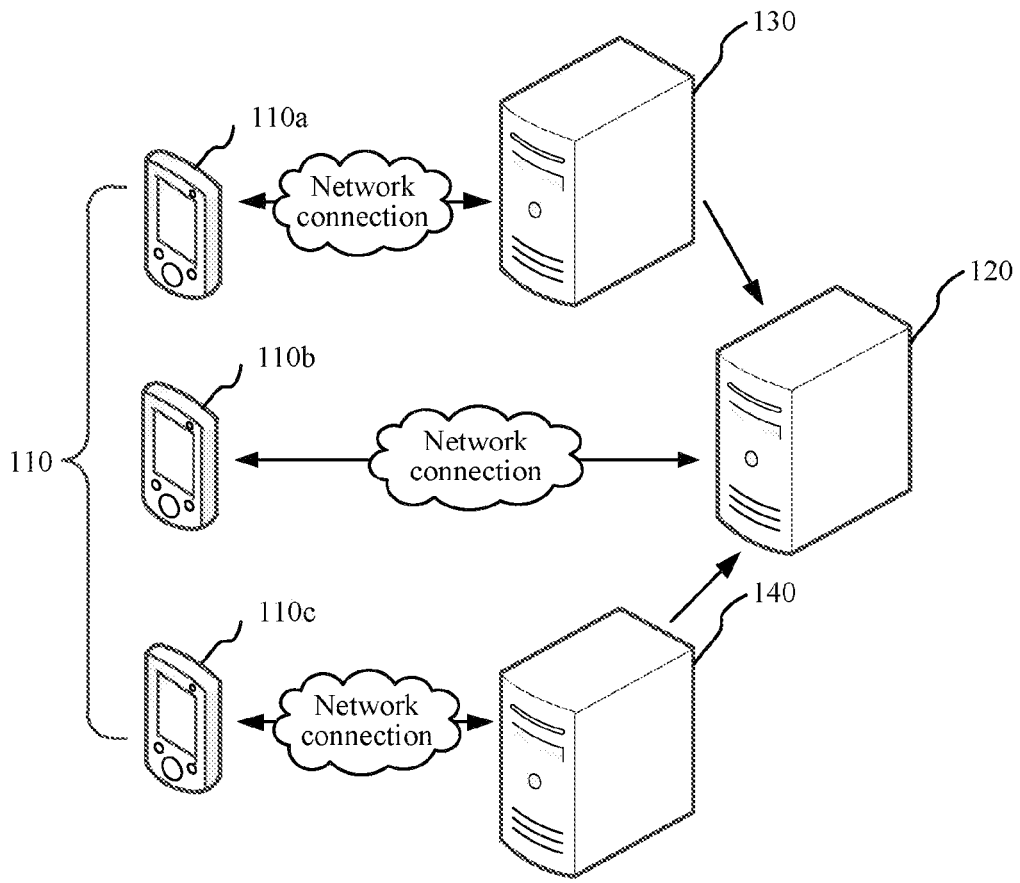
FIG. 1 is a system block diagram of a melody information processing system according to an embodiment.

As shown in FIG. 1, an embodiment provides a melody information processing system, including a user terminal 110 (user terminals 110a, 110b, and 110c in FIG. 1), a humming recognition server 120, a singing server 130, and a song server 140. The user terminal 110 includes a mobile terminal, a vehicular device, a personal computer, or the like. The mobile terminal includes at least one of a mobile phone, a tablet computer, an intelligent watch, a personal digital assistant (PDA), and the like. The humming recognition server 120, the singing server 130, and the song server 140 may all be independent physical server devices or may be a physical server cluster. A humming recognition application program, a singing application program, and a song playback application program are installed in the user terminal 110. The user terminal 110 communicates with the humming recognition server 120 by using the humming recognition application program, communicates with the singing server 130 by using the singing application program, and communicates with the song server 140 by using the song playback application program.

Figure 2:
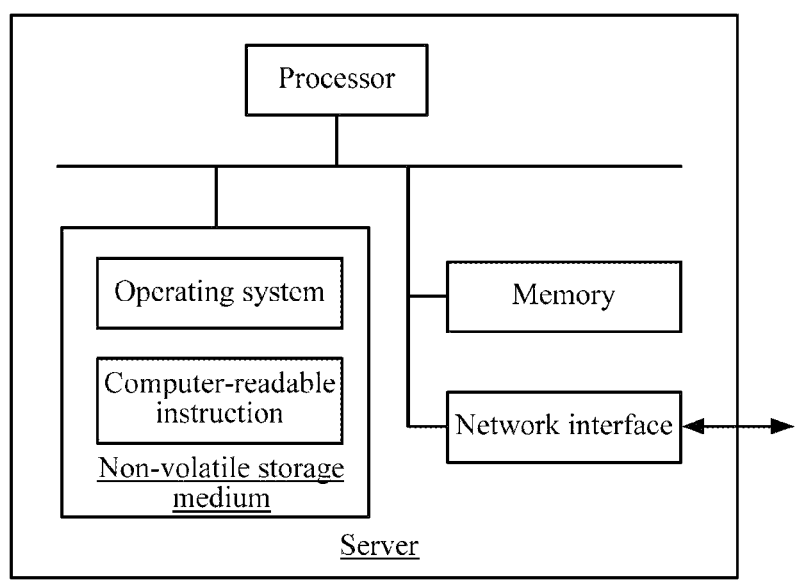
FIG. 2 is a functional block diagram of a server according to an embodiment.

As shown in FIG. 2, an embodiment provides a server. The server may be used as a humming recognition server 120, and the server includes a processor, a non-volatile storage medium, a memory, and a network interface that are connected by using a system bus. The processor has a computing function and a function of controlling the server 120 to work. The non-volatile storage medium includes at least one of a magnetic storage medium, an optical storage medium, and a flash storage medium. The non-volatile storage medium stores an operating system, and further stores computer-readable instructions. The computer-readable instructions, when executed by the processor, cause the processor to implement a melody information processing method. The method includes: receiving a piece of MIDI data corresponding to a song; obtaining a song identifier of the song; generating first melody information according to the MIDI data; storing the first melody information in association with the song identifier in a melody database; receiving a set of user unaccompanied-singing audio data that is uploaded from a user terminal; extracting, according to the set of user unaccompanied-singing audio data, second melody information corresponding to the song identifier; and storing the second melody information in association with the song identifier in the melody database. The network interface is configured to connect to the user terminal 110 by using a network.

Figure 3:
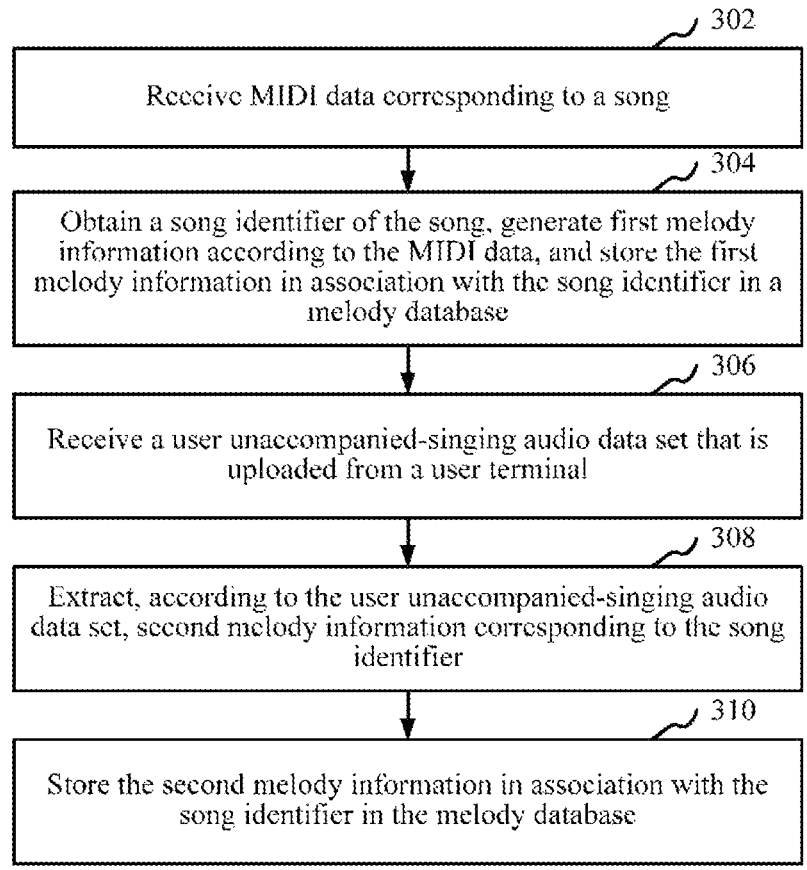
FIG. 3 is a flowchart of a melody information processing method according to an embodiment.

As shown in FIG. 3, an embodiment provides a melody information processing method. This embodiment is described by using an example in which the method is applied to the humming recognition server 120 in FIG. 1 and FIG. 2. The method specifically includes the following steps:

Step 302: Receive MIDI data, including a piece of MIDI data corresponding to a song.

Specifically, the humming recognition server may collect already existing MIDI files, to form a MIDI file set. Specifically, the humming recognition server may crawl an existing MIDI file set from a network, or may pull an existing MIDI file set from a first-party server storing MIDI files.

Step 304: Obtain a song identifier of a particular song to which a piece of the MIDI data corresponds, generate first melody information according to the MIDI data, and store the first melody information in association with the song identifier in a melody database.

Specifically, the humming recognition server may traverse each MIDI file in a MIDI file set, and extract song recognition information in the MIDI file, so as to obtain a corresponding song identifier according to the extracted song recognition information. The song recognition information may be information, for example, a song name or a singer name, that can be used to identify a song. The MIDI file includes pitch information and corresponding timing information, and each note may be represented by a corresponding pitch value. Therefore, the pitch information and the corresponding timing information that are included in the MIDI file may form the first melody information. The humming recognition server then adds the first melody information in association with the respective song identifier to the melody database.

Step 306: Receive a user unaccompanied-singing audio data set that is uploaded from a user terminal.

Specifically, user unaccompanied-singing audio data may include singing sound of a user but no background music (e.g., an instrumental accompaniment). The user terminal may record, by using a singing application program, user unaccompanied-singing audio data corresponding to the song identifier, and uploads the recorded user unaccompanied-singing audio data to a singing server, so that the user unaccompanied-singing audio data set is stored in the singing server. The humming recognition server may periodically obtain the user unaccompanied-singing audio data set from the singing server. Alternatively, the singing server may synchronize the user unaccompanied-singing audio data set in the singing server to the humming recognition server periodically or when user unaccompanied-singing audio data is newly added.

When recording the user unaccompanied-singing audio data by using the singing application program, the user terminal may play an instrumental accompaniment corresponding to the song identifier using a headset. A user may sing along with the instrumental accompaniment provided through the headset. The user terminal obtains unaccompanied sound of the user by using a sound pickup of the user terminal, and obtains the user unaccompanied-singing audio data by means of processing of a processor of the user terminal.

Step 308: Extract, according to the user unaccompanied-singing audio data set, second melody information corresponding to the song identifier.

Specifically, the humming recognition server may traverse each piece of user unaccompanied-singing audio data in the user unaccompanied-singing audio data set, and extract the second melody information from the traversed user unaccompanied-singing audio data. Melody information is information that can reflect a change trend of pitches of a song with time, and the melody information may be indicated by using a correspondence between a series of pitch values and corresponding timing information. The timing information is, for example, start time of a pitch or duration of a pitch. The second melody information is melody information extracted from the user unaccompanied-singing audio data set, and differs from the third melody information in this disclosure with respect to the sources of audio data thereof.

Step 310: Store the second melody information in association with the song identifier in the melody database.

Specifically, the humming recognition server may include a dedicated database server. After extracting the second melody information, the humming recognition server may store the second melody information in association with the corresponding song identifier in the melody database in the database server. The song identifier is a unique identifier of a song, and may be indicated by using a unique character string. Different songs may be distinguished by using song names and singer names, and different songs are assigned different song identifiers.

In the melody information processing method, the melody database is set up by using a plurality of sources, including the MIDI data and the user unaccompanied-singing audio data set uploaded from the user terminal. Accordingly, a dedicated MIDI file is no longer necessary, thereby greatly reducing costs of setting up the melody database. In addition, a same song identifier in the song melody database may correspond to melody information obtained by transcribing audio data from different sources, so that the hit rate of recognition can be improved when humming recognition is performed by using the melody database as described in the present application.

Figure 4:
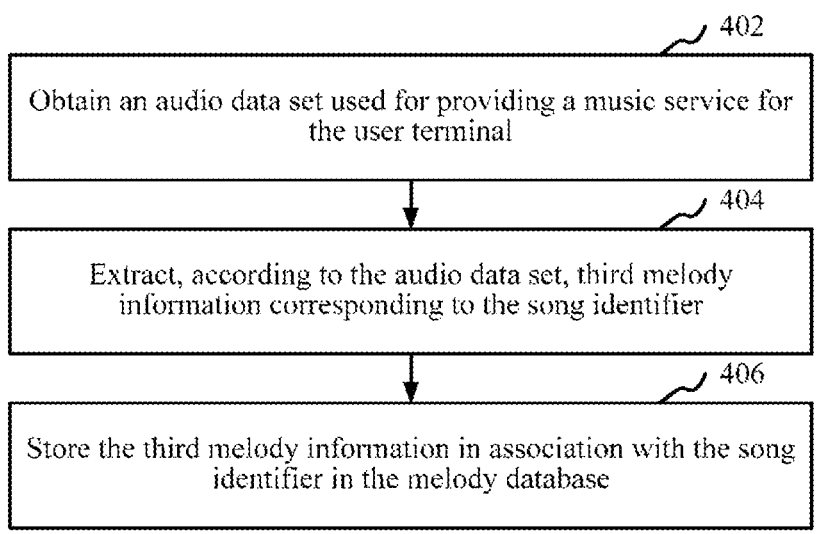
FIG. 4 is a flowchart of steps of adding melody information from a set of audio data to a melody database according to an embodiment.

As shown in FIG. 4, in an embodiment, the song melody information processing method further includes steps of adding melody information from an audio data set to the melody database, and specifically includes the following steps:

Step 402: Obtain an audio data set used for providing a music service for the user terminal.

Specifically, a song server stores the audio data set including pieces of audio data that each corresponds to a song and has a corresponding song identifier. The song server may receive a song obtaining request triggered by the user terminal by using a song playback application program, and obtain the song identifier according to the song obtaining request, so as to extract corresponding audio data from the audio data set according to the obtained song identifier and feed back the audio data of the requested song to the user terminal. The user terminal plays the audio data. The humming recognition server may periodically obtain the audio data set from the song server. Alternatively, the song server may synchronize the audio data set in the song server to the humming recognition server periodically or when audio data is newly added.

Step 404: Extract, according to the audio data set, third melody information corresponding to the song identifier.

Specifically, the humming recognition server may traverse each piece of audio data in the audio data set, and extract the third melody information from the traversed audio data. The third melody information is melody information extracted from the audio data set.

Step 406: Store the third melody information in association with the song identifier in the melody database.

Specifically, the humming recognition server may include a dedicated database server. After extracting the third melody information, the humming recognition server may store the third melody information in association with the corresponding song identifier in the melody database in the database server. A sequence of step 306 to step 310 and a sequence of step 402 to step 406 may be interchanged or processed in parallel.

Figure 5:
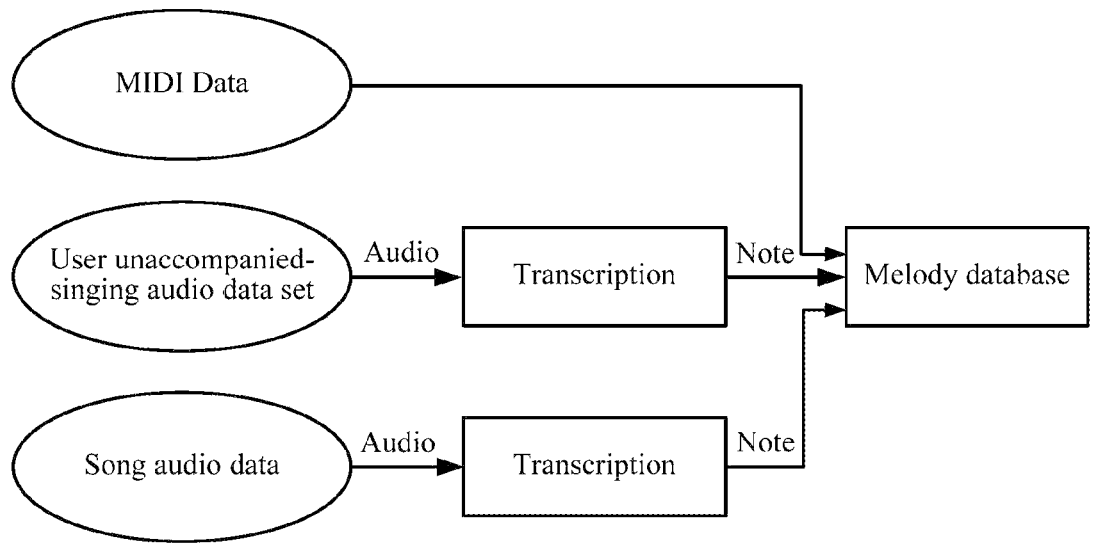
FIG. 5 is a data flow diagram of a process of obtaining melody information from a plurality of sources to set up a melody database according to an embodiment.

In this embodiment, referring to FIG. 5, the MIDI data may be directly added to the melody database. For the user unaccompanied-singing audio data set and the audio data set, melody information indicating notes using pitch information and the corresponding timing information may be obtained by means of transcription. In this way, data from a plurality of sources is used for hybrid database setup, so that the humming recognition performance can be significantly improved while costs of database setup are reduced.

In an embodiment, before step 308, the method further includes: filtering out at least one of the following types of user unaccompanied-singing audio data from the user unaccompanied-singing audio data set: a piece of user unaccompanied-singing audio data that corresponds to an incomplete rendition of a corresponding song; a piece of user unaccompanied-singing audio data that is identified as a rendition of a corresponding song recorded without using a headset for feeding a corresponding instrumental accompaniment; and a piece of user unaccompanied-singing audio data that is determined to include noise or an instrumental accompaniment.

The piece of user unaccompanied-singing audio data that corresponds an incomplete rendition of a song (i.e., an incomplete user unaccompanied-singing audio data) may be a result of a user sings only a part of a song and then finishes recording. The humming recognition server may recognize user unaccompanied-singing audio data whose audio time length is less than a preset time length as the incomplete user unaccompanied-singing audio data.

The humming recognition server may further recognize the incomplete user unaccompanied-singing audio data according to a mark that is carried in user unaccompanied-singing audio data and used for indicating whether the data corresponds to a complete rendition of a song. The mark may be added by the user terminal by using a singing application program when finishing recording of the user unaccompanied-singing audio data. Specifically, the user terminal may obtain an accompaniment end time point of an instrumental accompaniment; determine whether a recording end time point when the recording ends is greater than or equal to the accompaniment end time point; and if yes, add a mark used for indicating completeness, or if not, add a mark used for indicating incompleteness. The user unaccompanied-singing audio data recorded without wearing a headset for feeding the corresponding instrumental accompaniment may be recognized by using a mark that is carried in user unaccompanied-singing audio data and used for indicating whether a headset is worn when recording.

Determining of the user unaccompanied-singing audio data including noise or accompaniment may be based on the following assumption: for common song audio data, human sound is generally distributed in a part of the data, and noise and accompaniment may occupy the entire audio. Therefore, obvious energy should exist only in a proportion of area in clean user unaccompanied-singing audio data. If obvious energy exists in an entire audio area, the audio has been polluted.

Specifically, the humming recognition server may obtain one piece of user unaccompanied-singing audio data, perform frame segmentation on the user unaccompanied-singing audio data in a timeline, then calculate root mean square energy of each audio frame, and count the quantity of audio frames whose root mean square energy is greater than a threshold. If a ratio of the counted quantity of audio frames to the total quantity of audio frames of the entire user unaccompanied-singing audio data meets a prior ratio, it is determined that the user unaccompanied-singing audio data is clean user unaccompanied-singing audio data. Alternatively, if a ratio of the counted quantity of audio frames to the total quantity of audio frames of the entire user unaccompanied-singing audio data does not meet a prior ratio, it is determined that noise or accompaniment exits in the user unaccompanied-singing audio data.

In this embodiment, because the incomplete user unaccompanied-singing audio data includes only part of melody information of a song, if a piece of to-be-recognized user humming audio data corresponds to a portion of the song that is not included in the user unaccompanied-singing audio data, the to-be-recognized user humming audio data may not be correctly recognized based on the melody information derived from the incomplete user unaccompanied-singing audio data. In addition, existence of the melody information derived from the incomplete user unaccompanied-singing audio data increases time of searching the melody database, and hence reducing the humming recognition performance. Therefore, the incomplete user unaccompanied-singing audio data may be filtered out. Also, the user unaccompanied-singing audio data recorded without using a headset or feeding the corresponding instrumental accompaniment and/or the user unaccompanied-singing audio data determined to include noise or an instrumental accompaniment can be filtered out, so as to prevent inaccurate melody information from affecting the humming recognition performance.

Figure 6:
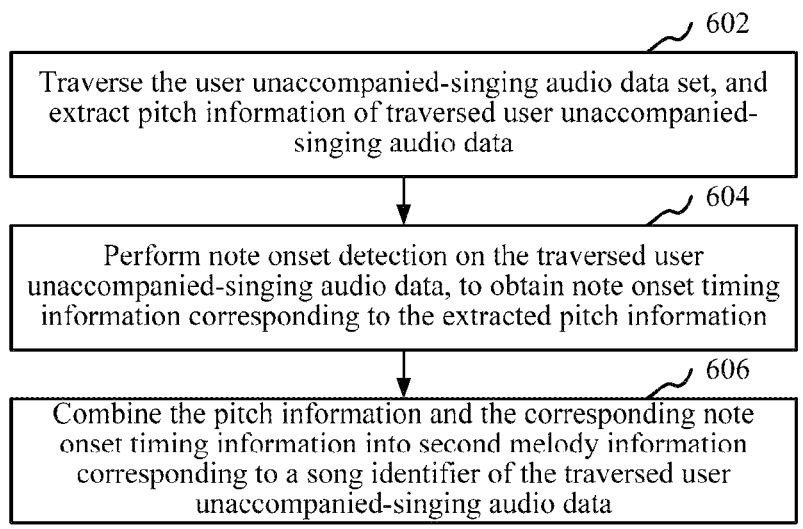
FIG. 6 is a flowchart of steps of extracting, according to a set of user unaccompanied-singing audio data, second melody information corresponding to a song identifier according to an embodiment.
Figure 7:
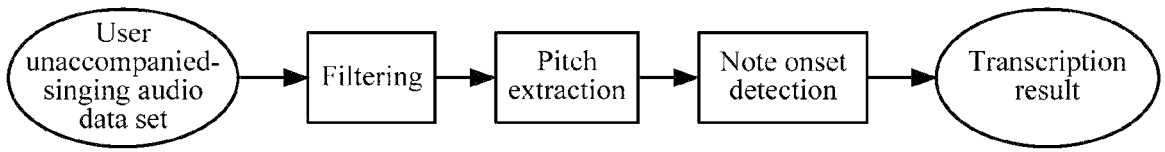
FIG. 7 is a data flow diagram of a process of transcribing a set of user unaccompanied-singing audio data to obtain second melody information according to an embodiment.

Referring to FIG. 6 and FIG. 7, in an embodiment, step 308 may further include the following steps:

Step 602: Traverse the user unaccompanied-singing audio data set, and obtain pitch information of traversed user unaccompanied-singing audio data.

Specifically, a pitch is a perception attribute of the auditory sense to sound arranged in the scale in an ascending sequence. An extraction process of the pitch is also an extraction process of a fundamental tone. A frequency of the fundamental tone is referred to as a fundamental frequency. The fundamental tone is a pure tone having a low frequency in speech but has a largest amplitude. A fundamental tone determines a pitch of an entire note.

The humming recognition server may extract a fundamental frequency by using a fundamental frequency extraction algorithm such as a time-domain event occurrence detection method, an autocorrelation function method, or a Yet Another Algorithm for Pitch Tracking (YAAPT) algorithm, so as to convert the fundamental frequency into a pitch according to a correspondence between the frequency and the pitch. The time-domain event occurrence detection method is based on such a theory: expression of an audio waveform in a time domain is periodical, and the quantity of times of repeatedly occurred events in a time period can be counted. Therefore, the fundamental frequency can be estimated by counting the quantity of times of events occurred per second. The time-domain event occurrence detection method includes, for example, a zero-crossing rate (ZCR) algorithm, a peak rate algorithm, and a slope event rate algorithm.

In the autocorrelation function method, it is considered that the user unaccompanied-singing audio data is a speech signal, and the speech signal is a signal changing with time and has the characteristic of short-term stability. In this way, the user unaccompanied-singing audio data may be divided into a group of audio frames for processing. Frame segmentation of the speech signal is implemented by means of windowing, and a window function may be a rectangular window or Hamming window.

An autocorrelation function of the user unaccompanied-singing audio data may be denoted as equation (1):

$$r_t(\tau) = \sum_{j=t+1}^{t+W} x_j x_{j+\tau} \qquad \text{equation (1)}$$

$r_t(\tau)$ indicates an autocorrelation function at a time point t; $x_i$, i=1 . . . , 2W indicates the user unaccompanied-singing audio data, and is an approximate periodic signal; W is the size of the window function; t indicates a time point; τ indicates a delay. When τ is equal to an integer multiple of a fundamental frequency period, a maximum value is generated. Therefore, the autocorrelation function may be calculated to search for the maximum value, to estimate a fundamental frequency of the user unaccompanied-singing audio data.

In an embodiment, the humming recognition server may extract a pitch of user unaccompanied-singing audio data by using a YIN algorithm based on an autocorrelation function. The YIN algorithm is a fundamental frequency estimator for speech and music. Specifically, the following steps may be performed to estimate the fundamental frequency, including the following step (1) to step (4):

(1): Calculate an autocorrelation function of the user unaccompanied-singing audio data, where calculation is specifically performed according to formula (1).

(2): Calculate a difference function according to the autocorrelation function.

The difference function may be represented by the equation (2):

$$d_t(\tau) = \sum_{j=1}^{W} (x_j - x_{j+\tau})^2 \quad \text{equation (2)}$$

If the autocorrelation function $r_t(\tau)$ is given, calculation of the difference function may be simplified into the following equation (3):

$$d_t(\tau) = r_t(0) + r_{t+\tau}(0) - 2r_t(\tau) \quad \text{equation (3)}$$

(3): Perform cumulative mean normalization on the difference function $d_t(\tau)$, to obtain a normalized difference function $d_t'(\tau)$. A smaller value generated at a high frequency due to resonance of a formant may be compensated by means of cumulative mean normalization.

$$d_t'(\tau) = \begin{cases} 1, & \tau = 0; \\ d_t(\tau) / \left[(1/\tau)\sum_{j=1}^{\tau} d_t(j)\right], & \tau \neq 0. \end{cases} \quad \text{equation (4)}$$

(4) Obtain a preset threshold s, and search for a minimum delay $\tau_{min}$ when a local minimum value of $d_t'(\tau)$ is obtained and $d_t'(\tau) < s$. The fundamental frequency $f_0 = 1/\tau_{min}$ is estimated. Further, a corresponding pitch may be obtained according to the estimated fundamental frequency.

Step 604: Perform note onset detection on the traversed user unaccompanied-singing audio data, to obtain note onset timing information corresponding to the obtained pitch information.

Specifically, the humming recognition server may perform note onset detection on the user unaccompanied-singing audio data by using a music note onset detection algorithm based on a phase feature, or may perform detection by using an automatic note onset detection method based on a differential all-phase mel-frequency cepstral coefficient (MFCC).

In an embodiment, the humming recognition server may perform note onset detection by using a sound onset detection by applying psychoacoustic knowledge method, and a process specifically includes: dividing the user unaccompanied-singing audio data into a plurality of frequency sub-bands by using a filter; for each frequency sub-band, extracting an amplitude contour A(t), calculating a first-order relative difference function based on the amplitude contour $$W(t) = \frac{d}{dt}(\log(A(t))),$$

extracting a local maximum value of W(t) as a note onset component, and estimating time and intensity of the note onset component; and determining a final note onset time based on time and intensity of note onset components of different frequency sub-bands.

Step 606: Combine the pitch information and the corresponding note onset timing information into second melody information corresponding to a song identifier of the traversed user unaccompanied-singing audio data.

Specifically, the humming recognition server combines the obtained pitch information and the note onset timing information corresponding to the pitch into a note sequence, to form the second melody information corresponding to the song identifier of the traversed user unaccompanied-singing audio data. After the traversing is completed, a second melody information set corresponding to the user unaccompanied-singing audio data set may be obtained.

In this embodiment, the user unaccompanied-singing audio data set is traversed to obtain the pitch information, and note onset detection is performed to obtain the note onset timing information corresponding to the pitch information, so that the second melody information is formed according to the obtained pitch information and the corresponding note onset timing information. In this way, the second melody information can be derived with improved precision, and the accuracy of a result of performing a humming recognition based on a melody database as described herein can also be enhanced.

Figure 8:
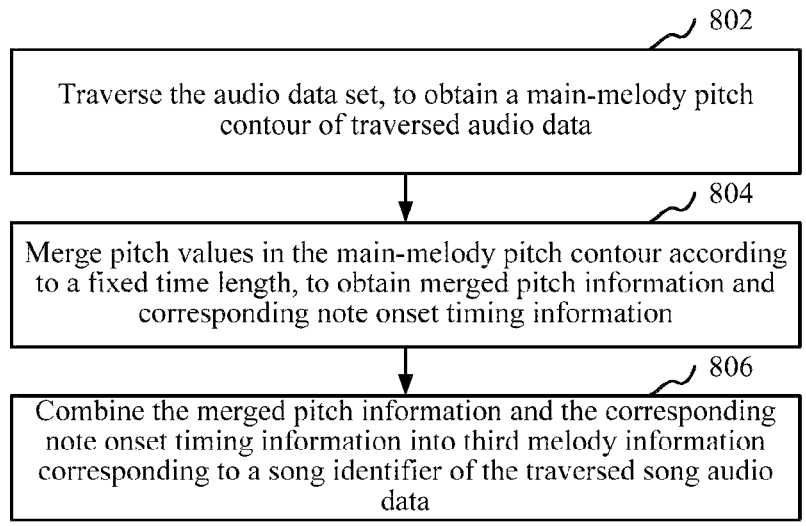
FIG. 8 is a flowchart of steps of extracting, according to a set of audio data, third melody information corresponding to a song identifier according to an embodiment.

In an embodiment, referring to FIG. 8, step 314 may further include the following steps:

Step 802: Traverse the audio data set that includes pieces of audio data corresponding to various song identifiers to obtain a main-melody pitch contour of traversed pieces of audio data.

Specifically, the humming recognition server may extract the main-melody pitch contour from a piece of audio data by using an existing main-melody extraction method, for example, a main-melody extraction technology based on harmonic overtone detection. A song generally includes a plurality of melody lines, and the plurality of melody lines includes a main-melody line of singing of a singer, a melody line of background music, and the like. The pitch contour corresponds to a fundamental tone sequence consecutive in time.

In an embodiment, the humming recognition server may extract the main-melody pitch contour of a piece of audio data by using a Melody Extraction from Polyphonic Music Signals using Pitch Contour Characteristics method. Specifically, short time Fourier transform may be first performed on the audio data, to extract a spectrum peak value of each audio frame; a candidate pitch of the audio data is extracted, and a significance function of each candidate pitch is calculated according to the extracted spectrum peak value and by using a harmonic addition method; a peak value of the significance function in each audio frame is extracted, and peak values consecutive in time and frequency are connected to form a pitch contour; and a series of feature values are calculated for each pitch contour, so that the main-melody pitch contour having a main-melody feature is selected according to the calculated feature values.

Step 804: Merge pitch values in the main-melody pitch contour within respective time intervals that are defined according to a fixed time length to obtain a merged pitch information and corresponding note onset timing information.

Specifically, in this embodiment, the humming recognition server does not perform note onset detection when determining the note onset timing information, but directly merges all pitch values within a fixed time length in the pitch contour into a merged pitch value of one note according to a time stamp in the traversed audio data. For example, pitch values within an interval of 50 milliseconds can be merged into a merged pitch value of one note. The merged pitch value may be an average value of all the pitch values within the particular time interval. The note onset time of the merged pitch value may be the time corresponding to an earliest pitch in all the corresponding pitch values within the particular time interval.

Step 806: Combine the merged pitch information and the corresponding note onset timing information into third melody information corresponding to a song identifier of the traversed audio data.

Specifically, the humming recognition server combines the merged pitch information and the corresponding note onset timing information into a note sequence, to form the third melody information corresponding to the song identifier of the traversed audio data. After the traversing is completed, a third melody information set corresponding to the traversed audio data set may be obtained.

In this embodiment, the audio data, for example, audio data of a common popular song, can be easily obtained from various sources. The third melody information can be extracted by using the audio data set providing a music service for the user terminal, so that the melody database can include samples of most popular songs, and the recognition performance of the melody database can be further improved when the melody database is used for humming recognition. When the third melody information is extracted, no note onset detection is performed, and the pitch values in the fixed time length in the main-melody pitch contour are merged to determine the pitch information and the note onset timing information, thereby improving the computing efficiency without reducing the humming recognition accuracy.

Figure 9:
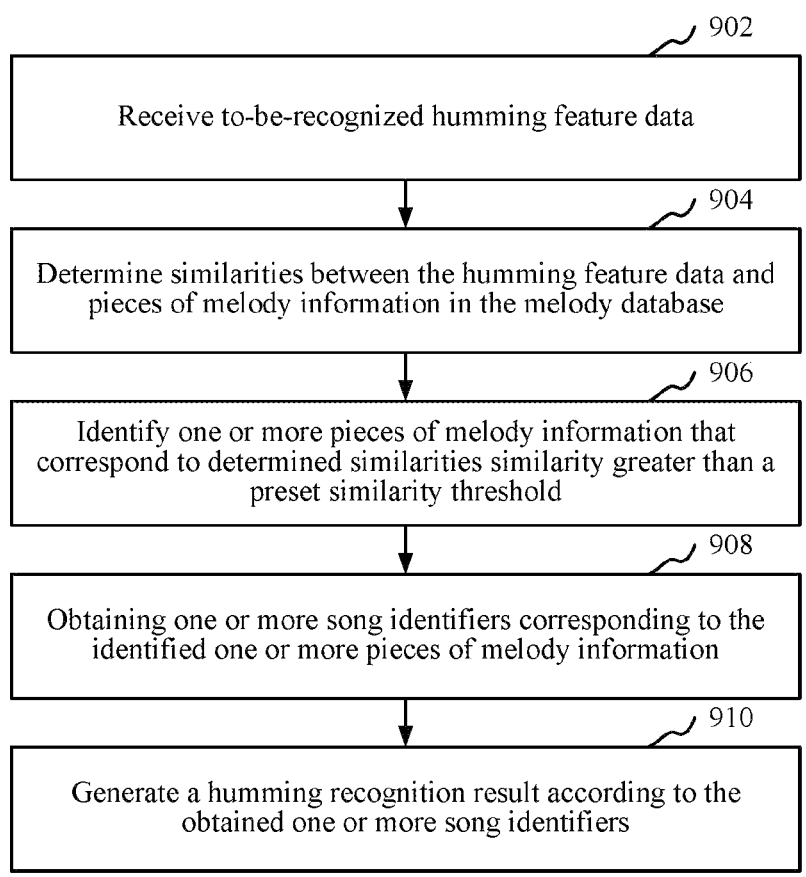
FIG. 9 is a flowchart of steps of performing humming recognition by using a song melody database according to an embodiment.

As shown in FIG. 9, in an embodiment, the melody information processing method further includes steps of performing humming recognition by using the melody database, and specifically includes the following steps:

Step 902: Receive a piece of to-be-recognized humming feature data.

Specifically, the user terminal may record a piece of to-be-recognized humming audio data by using a humming recognition application program, perform feature extraction on the humming audio data to obtain to-be-recognized humming feature data, and upload the humming feature data to the humming recognition server. The humming recognition server receives the humming feature data. After recording the to-be-recognized humming audio data by using the humming recognition application program, the user terminal may alternatively directly upload the humming audio data to the humming recognition server. The humming recognition server performs feature extraction on the humming audio data, to obtain to-be-recognized humming feature data. The humming feature data includes a pitch feature and a time feature corresponding to the pitch feature.

Step 904: Determine similarities between the humming feature data and pieces of melody information in the melody database.

Specifically, the humming recognition server may calculate the similarities between the humming feature data and the pieces of melody information in the melody database by using a dynamic time warping (DTW) algorithm.

Step 906: Identifying one or more pieces of melody information that correspond to determined similarities greater than a preset similarity threshold.

Step 908: Obtain one or more song identifiers corresponding to the identified one or more pieces of melody information.

Specifically, the humming recognition server may traverse all the obtained similarities; compare the traversed similarities with the preset similarity threshold; and if the traversed similarity is greater than the preset similarity threshold, identify the piece of melody information, obtain the corresponding song identifier, and add the song identifier into a candidate song set until the traversing is completed or until a specified quantity of song identifiers is found. The humming recognition server may specifically screen out a similarity that is greater than the preset similarity threshold and is largest from the obtained similarities.

Step 910: Generate a humming recognition result according to the obtained one or more song identifiers.

Specifically, the humming recognition server may obtain corresponding song information, for example, a combination of one or more of a song name, a song album name, a singer name, a song type, a song playback link, and the like according to the obtained song identifier, generate the humming recognition result according to obtained song information, and feed back the humming recognition result to the user terminal.

Figure 10:
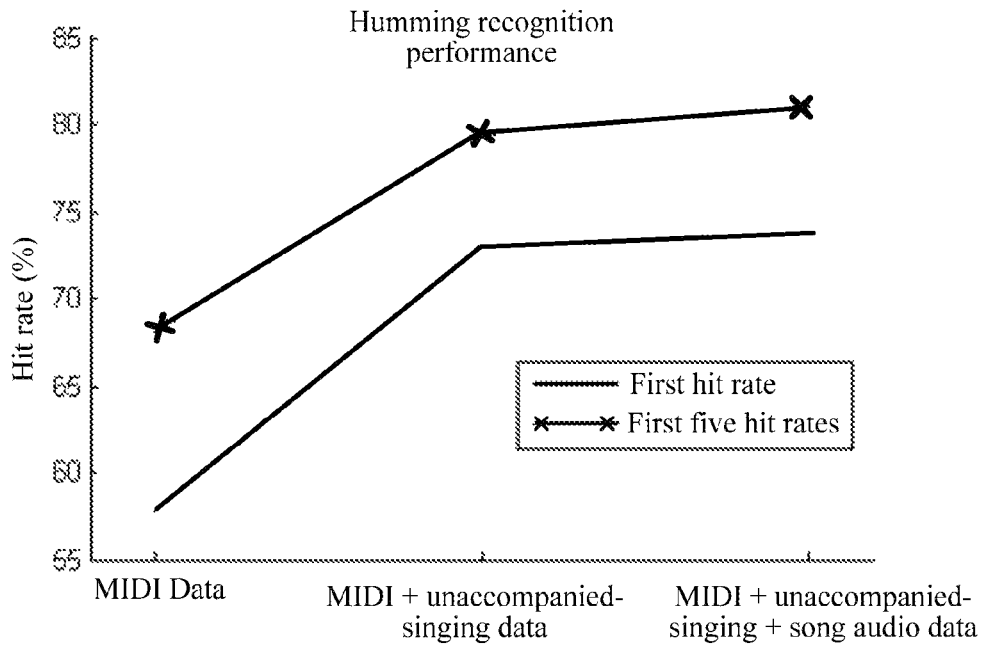
FIG. 10 is a chart showing comparison of the humming recognition performance using different song melody databases that are set up based on three different database setup solutions according to an embodiment.

In this embodiment, a melody database set up according to audio data from a plurality of sources is used to perform humming recognition, so that a precise humming recognition result can be obtained. In addition, referring to FIG. 10, compared with database setup purely by using MIDI data, in the solution in which the database is set up in combination with the MIDI data and the user unaccompanied-singing audio data, the first hit rate of humming recognition is increased by more than 15%, and the first five hit rates are increased by more than 10%. Compared with the solution in which the database is set up in combination with the MIDI file and the user unaccompanied-singing audio data, in the solution in which the database is set up in combination with the MIDI data, the user unaccompanied-singing audio data, and the song audio data, the hit rate is further increased.

Figure 11:
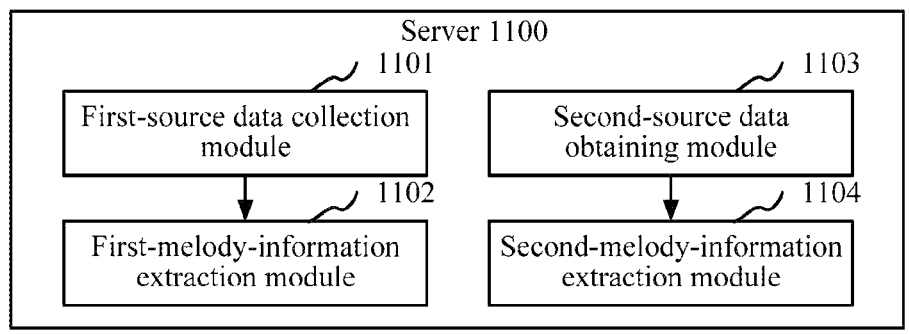
FIG. 11 is a structural block diagram of a server according to an embodiment.

As shown in FIG. 11, an embodiment provides a server 1100. An inner structure of the server may correspond to the structure shown in FIG. 2. All or some of the following modules may be implemented by software, hardware, or a combination thereof. The server 1100 includes: a first-source data collection module 1101, a first-melody-information extraction module 1102, a second-source data obtaining module 1103, and a second-melody-information extraction module 1104.

The first-source data collection module 1101 is configured to receive MIDI data.

Specifically, the first-source data collection module 1101 may receive already existing MIDI files, to form a MIDI file set. Specifically, the first-source data collection module 1101 may crawl an existing MIDI file set from a network, or may pull an existing MIDI file set from a first-party server storing MIDI files.

The first-melody-information extraction module 1102 is configured to: obtain a song identifier of a piece of MIDI data, generate first melody information according to the MIDI data, and store the first melody information in association with the song identifier in a melody database.

Specifically, the first-melody-information extraction module 1102 may traverse each MIDI file in a MIDI file set, and extract song recognition information in the MIDI file, so as to obtain a corresponding song identifier according to the extracted song recognition information. The song recognition information may be information, for example, a song name or a singer name, that can be used to identify a song. The MIDI file includes pitch information and corresponding timing information, and each pitch indicates a note. Therefore, the pitch information and the corresponding timing information included in the MIDI file may form the first melody information. The first-melody-information extraction module 1102 then adds the first melody information to the song melody database.

The second-source data obtaining module 1103 is configured to receive a user unaccompanied-singing audio data set uploaded from a user terminal.

Specifically, user unaccompanied-singing audio data is data used for recording singing of a user but no background music. The user terminal may record, by using a singing application program, user unaccompanied-singing audio data corresponding to the song identifier, and uploads the recorded user unaccompanied-singing audio data to a singing server, so that the user unaccompanied-singing audio data set is formed in the singing server. The second-source data obtaining module 1103 may periodically obtain the user unaccompanied-singing audio data set from the singing server. Alternatively, the singing server may synchronize the user unaccompanied-singing audio data set in the singing server to the second-source data obtaining module 1103 periodically or when user unaccompanied-singing audio data is newly added.

When recording the user unaccompanied-singing audio data by using the singing application program, the user terminal may play an instrumental accompaniment corresponding to a song identifier using a headset. A user may sing along the instrumental accompaniment provided through the headset. The user terminal obtains unaccompanied sound of the user by using a sound pickup of the user terminal, and obtains the user unaccompanied-singing audio data by means of processing of a processor of the user terminal.

The second-melody-information extraction module 1104 is configured to: extract, according to the user unaccompanied-singing audio data set, second melody information corresponding to the song identifier, and store the second melody information in association with the song identifier in the melody database.

Specifically, the second-melody-information extraction module 1104 may traverse each piece of user unaccompanied-singing audio data in the user unaccompanied-singing audio data set, and extract the second melody information from the traversed user unaccompanied-singing audio data. Melody information is information that can reflect a change trend of pitches of a song with time, and the melody information may be indicated by using a correspondence between a series of pitch values and corresponding timing information. The timing information is, for example, start time of a pitch or duration of a pitch. The second melody information is melody information extracted from the user unaccompanied-singing audio data set, and differs from the third melody information with respect to the sources of audio data thereof.

Specifically, after extracting the second melody information, the second-melody-information extraction module 1104 may store the extracted second melody information in association with the corresponding song identifier in the melody database in a database server. The song identifier is a unique identifier of a song, and may be indicated by using a unique character string. Different songs may be distinguished by using song names and singer names, and different songs are assigned different song identifier.

The server 1100 sets up the melody database by using a plurality of sources, including the MIDI data and the user unaccompanied-singing audio data set uploaded from the user terminal. Accordingly, a dedicated MIDI file is no longer necessary, thereby greatly reducing costs of setting up the melody database. In addition, a same song identifier in the melody database may correspond to melody information obtained by transcribing audio data from different sources, so that the hit rate of recognition can be improved when humming recognition is performed by using the melody database as described in the present application.

Figure 12:
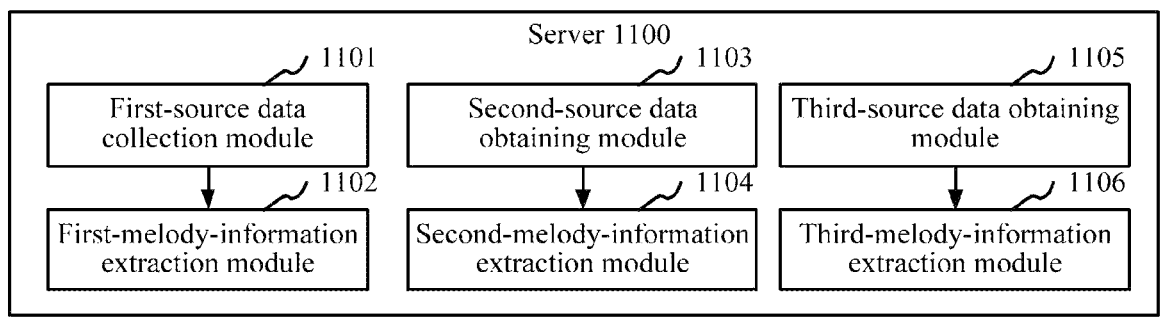
FIG. 12 is a structural block diagram of a server according to another embodiment.

As shown in FIG. 12, in an embodiment, the server 1100 further includes: a third-source data obtaining module 1105 and a third-melody-information extraction module 1106.

The third-source data obtaining module 1105 is configured to obtain an audio data set used for providing a music service for the user terminal.

Specifically, a song server stores the audio data set including pieces of audio data of various songs, and each piece of song audio data in the song audio data set has a corresponding song identifier. The song server may receive a song obtaining request triggered by the user terminal by using a song playback application program, and obtain the song identifier according to the song obtaining request, so as to extract corresponding song audio data from the audio data set according to the obtained song identifier and feed back the audio data of the identified song to the user terminal. The user terminal plays the audio data. The third-source data obtaining module 1105 may periodically obtain the audio data set from the song server. Alternatively, the song server may synchronize the audio data set in the song server to the third-source data obtaining module 1105 periodically or when audio data is newly added.

The third-melody-information extraction module 1106 is configured to: extract, according to the audio data set, third melody information corresponding to the song identifier, and store the third melody information in association with the song identifier in the song melody database.

Specifically, the third-melody-information extraction module 1106 may traverse each piece of audio data in the audio data set, and extract the third melody information from the traversed audio data. The third melody information is melody information extracted from the audio data set. After extracting the third melody information, the third-melody-information extraction module 1106 may store the extracted third melody information in association with the corresponding song identifier in the melody database in the database server.

In this embodiment, referring to FIG. 5, the MIDI data may be directly added to the melody database. For the user unaccompanied-singing audio data set and the audio data set, melody information indicating notes using pitch information and the corresponding timing information may be obtained by means of transcription. In this way, data from a plurality of sources is used for hybrid database setup, so that the humming recognition performance can be significantly improved while costs of database setup are reduced.

Figure 13:
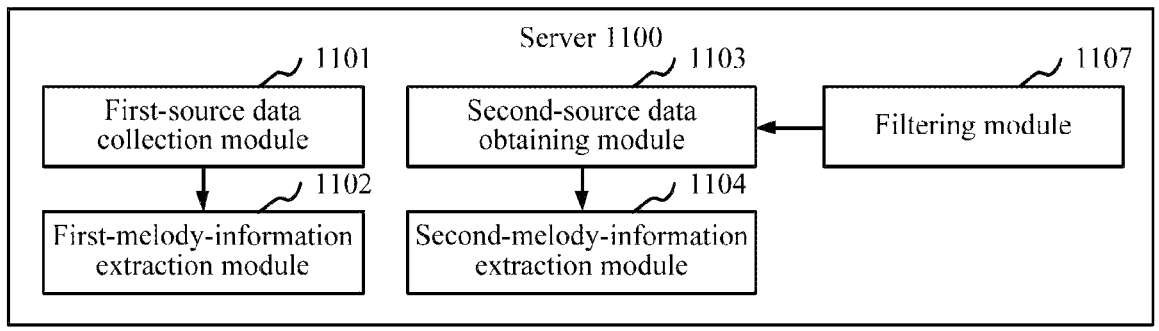
FIG. 13 is a structural block diagram of a server according to still another embodiment.

As shown in FIG. 13, in an embodiment, the server 1100 further includes: a filtering module 1107, configured to filter out at least one of the following types of user unaccompanied-singing audio data from the user unaccompanied-singing audio data set: a piece of user unaccompanied-singing audio data that corresponds to an incomplete rendition of a corresponding song; a piece of user unaccompanied-singing audio data that is identified as a rendition of a corresponding song recorded without using a headset for feeding a corresponding instrumental accompaniment; and a piece of user unaccompanied-singing audio data that is determined to include noise or an instrumental accompaniment.

A piece of user unaccompanied-singing audio data that corresponds to an incomplete rendition of a song (i.e., an incomplete user unaccompanied-singing audio data) may be a result of a user singing only a part of a song and then finishes recording. The filtering module 1107 may recognize user unaccompanied-singing audio data whose audio time length is less than a preset time length as the incomplete user unaccompanied-singing audio data.

The filtering module 1107 may further recognize the incomplete user unaccompanied-singing audio data according to a mark that is carried in user unaccompanied-singing audio data and used for indicating whether the data corresponds to a complete rendition of a song. The mark may be added by the user terminal by using a singing application program when finishing recording of the user unaccompanied-singing audio data. Specifically, the user terminal may obtain an accompaniment end time point of instrumental accompaniment; determine whether a recording end time point when the recording ends is greater than or equal to the accompaniment end time point; and if yes, add a mark used for indicating completeness, or if not, add a mark used for indicating incompleteness. The user unaccompanied-singing audio data recorded without wearing a headset for feeding the corresponding instrumental accompaniment may be recognized by using a mark that is carried in user unaccompanied-singing audio data and used for indicating whether a headset is worn when recording.

Determining of the user unaccompanied-singing audio data including noise or accompaniment may be based on the following assumption: for common song audio data, human sound is generally distributed in a part of the data, and noise and accompaniment may occupy the entire audio. Therefore, obvious energy should exist only in a proportion of area in clean user unaccompanied-singing audio data. If obvious energy exists in an entire audio area, the audio has been polluted.

Specifically, the filtering module 1107 may obtain one piece of user unaccompanied-singing audio data, perform frame segmentation on the user unaccompanied-singing audio data in a timeline, then calculate root mean square energy of each audio frame, and count the quantity of audio frames whose root mean square energy is greater than a threshold. If a ratio of the counted quantity of audio frames to the total quantity of audio frames of the entire user unaccompanied-singing audio data meets a prior ratio, it is determined that the user unaccompanied-singing audio data is clean user unaccompanied-singing audio data. Alternatively, if a ratio of the counted quantity of audio frames to the total quantity of audio frames of the entire user unaccompanied-singing audio data does not meet a prior ratio, it is determined that noise or accompaniment exits in the user unaccompanied-singing audio data.

In this embodiment, because the incomplete user unaccompanied-singing audio data includes only part of melody information of a song, if a piece of to-be-recognized user humming audio data corresponds to a portion of the song that is not included in the user unaccompanied-singing audio data, the to-be-recognized user humming audio data may not be correctly recognized based on the melody information derived from the incomplete user unaccompanied-singing audio data. In addition, existence of the melody information derived from the incomplete user unaccompanied-singing audio data increases time of searching the melody database, and hence reducing the humming recognition performance. Therefore, the incomplete user unaccompanied-singing audio data may be filtered out. Also, the user unaccompanied-singing audio data recorded without using a headset or feeding the corresponding instrumental accompaniment and/or the user unaccompanied-singing audio data determined to include noise or an instrumental accompaniment can be filtered out, so as to prevent inaccurate melody information from affecting the humming recognition performance.

In an embodiment, the second-melody-information extraction module 1104 is specifically configured to: traverse a piece of user unaccompanied-singing audio data that corresponds to the song identifier to obtain pitch information of the traversed piece of user unaccompanied-singing audio data; perform note onset detection on the traversed piece of user unaccompanied-singing audio data to obtain note onset timing information corresponding to the obtained pitch information, to obtain note onset time corresponding to the extracted pitch; and combine the pitch information and the corresponding note onset timing information into the second melody information corresponding to the song identifier.

In this embodiment, the user unaccompanied-singing audio data set is traversed to obtain the pitch information, and note onset detection is performed to obtain the note onset timing information corresponding to the pitch information, so that the second melody information is formed according to the obtained pitch information and the corresponding note onset timing information. In this way, the second melody information can be derived with improved precision, and the accuracy of a result of performing a humming recognition based on a melody database as described herein can also be enhanced.

In an embodiment, the server 1100 in FIG. 13 may further include a third-source data obtaining module 1105 and a third-melody-information extraction module 1106 as shown in FIG. 12. In some embodiments, the third-melody-information extraction module 1106 is specifically configured to: traverse a piece of the audio data set that corresponds to the song identifier to obtain a main-melody pitch contour of the traversed piece of song audio data; merge pitch values in the main-melody pitch contour within respective time intervals that are defined according to a fixed time length to obtain a merged pitch information and corresponding note onset timing information; and combine the merged pitch information and the corresponding note onset timing information into third melody information corresponding to the song identifier.

In this embodiment, the audio data, for example, audio data of a common popular song, can be easily obtained from various sources. The third melody information can be extracted by using the audio data set providing a music service for the user terminal, so that the melody database can include samples of most popular songs, and the recognition performance of the melody database can be further improved when the melody database is used for humming recognition. When the third melody information is extracted, no note onset detection is performed, and the pitch values in the fixed time length in the main-melody pitch contour are merged to determine the pitch information and the note onset timing information, thereby improving the computing efficiency without reducing the humming recognition accuracy.

Figure 14:
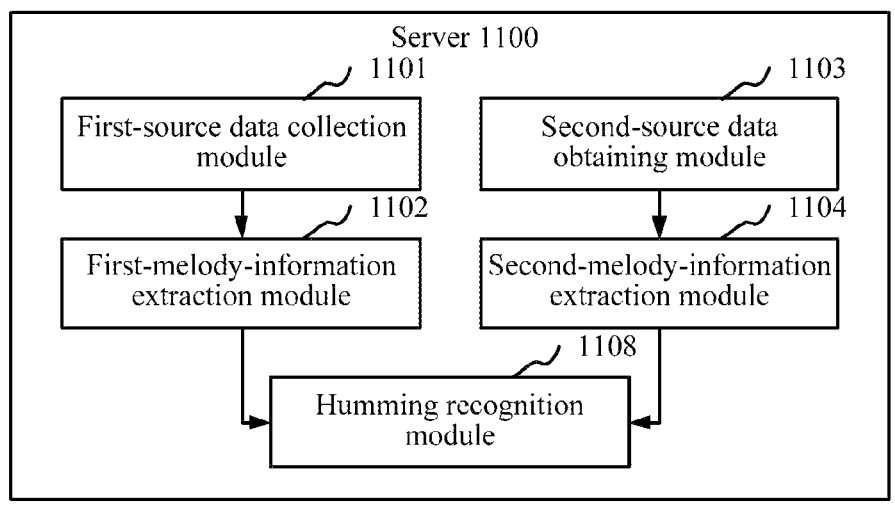
FIG. 14 is a structural block diagram of a server according to yet another embodiment.

As shown in FIG. 14, in an embodiment, the server 1100 further includes: a humming recognition module 1108, configured to: receive a piece of to-be-recognized humming feature data; determine similarities between the piece of humming feature data and pieces of melody information in the melody database; identify one or more pieces of melody information that correspond to determined similarities greater than a preset similarity threshold; obtain one or more song identifiers corresponding to the identified one or more pieces of melody information; and generate a humming recognition result according to the obtained one or more song identifiers.

In this embodiment, a melody database set up according to audio data from a plurality of sources is used to perform humming recognition, so that a precise humming recognition result can be obtained. In addition, referring to FIG. 10, compared with database setup purely by using MIDI data, in the solution in which the database is set up in combination with the MIDI file and the user unaccompanied-singing audio data, the first hit rate of humming recognition is increased by more than 15%, and the first five hit rates are increased by more than 10%. Compared with the solution in which the database is set up in combination with the MIDI file and the user unaccompanied-singing audio data, in the solution in which the database is set up in combination with the MIDI data, the user unaccompanied-singing audio data, and the song audio data, the hit rate is further increased.

An embodiment provides a server including a processor. The processor is configured to: receive a piece of Musical Instrument Digital Interface (MIDI) data corresponding to a song; obtain a song identifier of the song; generate first melody information according to the MIDI data; store the first melody information in association with the song identifier in a melody database; receive a user unaccompanied-singing audio data set that is uploaded from a user terminal; extract, according to the user unaccompanied-singing audio data set, second melody information corresponding to the song identifier; and store the second melody information in association with the song identifier in the melody database.

In an embodiment, the processor is further configured to, before extracting the second melody information corresponding to the song identifier: filter out at least one of the following types of user unaccompanied-singing audio data from the user unaccompanied-singing audio data set: a piece of user unaccompanied-singing audio data that corresponds to an incomplete rendition of a corresponding song; a piece of user unaccompanied-singing audio data that is identified as a rendition of a corresponding song recorded without using a headset for feeding a corresponding instrumental accompaniment; and a piece of user unaccompanied-singing audio data that is determined to include noise or an instrumental accompaniment.

In an embodiment, the processor is further configured to: traverse a piece of the user unaccompanied-singing audio data set that correspond to the song identifier to obtain pitch information of the traversed piece of the user unaccompanied-singing audio data set; perform note onset detection on the traversed piece of the user unaccompanied-singing audio data set to obtain note onset timing information corresponding to the obtained pitch information; and combine the pitch information and the corresponding note onset timing information into the second melody information corresponding to the song identifier.

In an embodiment, the processor is further configured to: divide the traversed piece of the user unaccompanied-singing audio data set into a plurality of frequency sub-bands by using a filter; for each frequency sub-band, extract an amplitude contour, calculate a first-order relative difference function based on the amplitude contour, extract a local maximum value of the first-order relative difference function as a note onset component, and estimate time and intensity of the note onset component; and determine a final note onset time based on time and intensity of note onset components of the different frequency sub-bands.

In an embodiment, the processor is further configured to: obtain an audio data set used for providing a music service for the user terminal; extract, according to the audio data set, third melody information corresponding to the song identifier; and store the third melody information in association with the song identifier in the melody database.

In an embodiment, the processor is further configured to: traverse a piece of the audio data set that corresponds to the song identifier to obtain a main-melody pitch contour of the traversed piece of audio data; merge pitch values in the main-melody pitch contour within respective time intervals that are defined according to a fixed time length to obtain a merged pitch information and corresponding note onset timing information; and combine the merged pitch information and the corresponding note onset timing information into third melody information corresponding to the song identifier.

In an embodiment, the processor is further configured to: receive a piece of to-be-recognized humming feature data; determine similarities between the piece of humming feature data and pieces of melody information in the melody database; identifying one or more pieces of melody information that correspond to determined similarities greater than a preset similarity threshold; obtaining one or more song identifiers corresponding to the identified one or more pieces of melody information; and generating a humming recognition result according to the obtained one or more song identifiers.

An embodiment provides non-transitory computer-readable storage medium storing computer-readable instructions, the computer-readable instructions, when executed by one or more processors, causing the one or more processors to perform a method comprising: receiving a piece of Musical Instrument Digital Interface (MIDI) data corresponding to a song; obtaining a song identifier of the song; generating first melody information according to the MIDI data; storing the first melody information in association with the song identifier in a melody database; receiving a user unaccompanied-singing audio data set that is uploaded from a user terminal; extracting, according to the user unaccompanied-singing audio data set, second melody information corresponding to the song identifier; and storing the second melody information in association with the song identifier in the melody database.

In an embodiment, the method further includes, before the extracting the second melody information corresponding to the song identifier: filtering out at least one of the following types of user unaccompanied-singing audio data from the user unaccompanied-singing audio data set: a piece of user unaccompanied-singing audio data that corresponds to an incomplete rendition of a corresponding song; a piece of user unaccompanied-singing audio data that is identified as a rendition of a corresponding song recorded without using a headset for feeding a corresponding instrumental accompaniment; and a piece of user unaccompanied-singing audio data that is determined to include noise or an instrumental accompaniment.

In an embodiment, the extracting the second melody information corresponding to the song identifier includes: traversing a piece of user unaccompanied-singing audio data that corresponds to the song identifier to obtain pitch information of the traversed piece of user unaccompanied-singing audio data; performing note onset detection on the traversed piece of user unaccompanied-singing audio data, to obtain note onset timing information corresponding to the obtained pitch information; and combining the pitch information and the corresponding note onset timing information into second melody information corresponding to the song identifier.

In an embodiment, the method further comprises: obtaining an audio data set used for providing a music service for the user terminal; extracting, according to the audio data set, third melody information corresponding to the song identifier; and storing the third melody information in association with the song identifier in the melody database.

In an embodiment, the extracting, according to the audio data set, third melody information corresponding to the song identifier includes: traversing a piece of the audio data set that corresponds to the song identifier to obtain a main-melody pitch contour of the traversed piece of song audio data; merging pitch values in the main-melody pitch contour within respective time intervals that are defined according to a fixed time length, to obtain a merged pitch information and corresponding note onset timing information; and combining the merged pitch information and the corresponding note onset timing information into third melody information corresponding to the song identifier.

In an embodiment, the method further includes: receiving a piece of to-be-recognized humming feature data; determining similarities between the piece of humming feature data and pieces of melody information in the melody database; identifying one or more pieces of melody information that correspond to determined similarities greater than a preset similarity threshold; obtaining one or more song identifiers corresponding to the identified one or more pieces of melody information; and generating a humming recognition result according to the obtained one or more song identifiers.

A person of ordinary skill in the art may understand that all or some of the processes of the methods in the embodiments may be implemented by a computer program instructing relevant hardware. The computer program may be stored in a non-transitory computer-readable storage medium. When the program runs, the processes of the methods in the embodiments are performed. The storage medium may be a non-volatile storage medium such as a magnetic disk, an optical disc, or a read-only memory (ROM), or may be a random access memory (RAM) or the like.

Various technical features in the foregoing embodiments may be combined randomly. For ease of description, possible combinations of various technical features in the foregoing embodiments are not all described. However, the combinations of the technical features should be considered as falling within the scope of the present disclosure provided that the combinations of the technical features are compatible with each other.

The foregoing embodiments only describe several implementations of this application, which are described specifically and in detail, and should not be construed as a limitation to the patent scope of the present application. It should be noted that, a person of ordinary skill in the art may make various changes and improvements without departing from the ideas of this application, which shall all fall within the protection scope of this application. Therefore, the protection scope of the patent of this application shall be subject to the appended claims.

What is claimed is:

1. A melody information processing method, comprising:
receiving a piece of Musical Instrument Digital Interface (MIDI) data corresponding to a song;
obtaining a song identifier of the song;
generating first melody information according to the MIDI data, the first melody information including first pitch information and first timing information corresponding to the first pitch information;
storing the first melody information in association with the song identifier in a melody database;
receiving a user unaccompanied-singing audio data set that is uploaded from one or more user tenninals;
extracting, by processing circuitry according to a piece of user unaccompanied-singing audio data that is from the user unaccompanied-singing audio data set and associated with the song identifier, second melody information, the second melody information including second pitch information and second timing information corresponding to the second pitch information, and
storing the second melody information in association with the song identifier in the melody database,
wherein the extracting the second melody information comprises:
traversing the piece of user unaccompanied-singing audio data to obtain the second pitch information:
performing note onset detection on the piece of user unaccompanied-singing audio data to obtain note onset timing information corresponding to the second pitch information as the second timing information, including
determining the note onset timing information based on time and intensity information of frequency sub-bands of the piece of user unaccompanied-singing audio data; and
combining the second pitch information and the note onset timing information into the second melody information.

2. The method according to claim 1, further comprising, before the second melody information corresponding to the song identifier is extracted:
determining whether the piece of user unaccompanied-singing audio data associated with the song identifier from the user unaccompanied-singing, audio data set meets one or more filtering-out criteria, wherein the one or more filtering-out criteria further includes:
the piece of user unaccompanied-singing audio data being an incomplete rendition of the song:
the piece of user unaccompanied-singing audio data being identified as a rendition of the song recorded without using a headset for feeding a corresponding instrumental accompaniment; or
the piece of riser unaccompanied-singing audio data being determined as including noise or the corresponding instrumental accompaniment.

3. The method according to claim 1, wherein the performing the note onset detection further comprises:
dividing the piece of user unaccompanied-singing audio data into components of the frequency sub-bands by using a filter; and
for a corresponding component of each frequency sub-band of the frequency sub-bands,
extracting an amplitude contour,
calculating a first-order relative difference function based on the amplitude contour, extracting a local maximum value of the first-order relative difference function as a note onset component, and estimating corresponding time and corresponding intensity of the note onset component.

4. The method according to claim 1, further comprising:
obtaining an audio data set used for providing a music service;
extracting, according to the audio data set, third melody information corresponding to the song identifier; and
storing the third melody information in association with the song identifier in the melody database.

5. The method according to claim 4, wherein the extracting, according to the audio data set, the third melody information corresponding to the song identifier comprises:
traversing a piece of audio data that corresponds to the song identifier from the audio data set to obtain a main-melody pitch contour of the traversed piece of audio data;
merging pitch values in the main-melody pitch contour within respective time intervals that are defined according to a fixed time length to obtain merged pitch information and corresponding note onset timing information; and
combining the merged pitch information and the corresponding note onset timing information into third melody information corresponding to the song identifier.

6. The method according to claim 1, further comprising:
receiving a piece of humming feature data;
determining similarities between the piece of humming feature data and pieces of melody information in the melody database;
identifying one or more pieces of melody information that correspond to the determined similarities greater than a preset similarity threshold;
obtaining one or more song identifiers corresponding to the identified one or more pieces of melody information; and
generating a humming recognition result according to the obtained one or more song identifiers.

7. A server, comprising:
a processor configured to:
receive a piece of Musical Instrument Digital Interface (MIDI) data corresponding to a song;
obtain a song identifier of the song;
generate first melody information according to the MIDI data, the first melody information including first pitch information and first timing information corresponding to the first pitch information;
store the first melody information in association with the song identifier in a melody database;
receive a user unaccompanied-singing audio data, set that is uploaded from one or more user terminals;
extract, according to a piece of user unaccompanied-singing audio data that is from the user unaccompanied-singing audio data set and associated with the song identifier, second melody information, the second melody information including second pitch information and second timing information corresponding to the second pitch information, and
store the second melody information in association with the song identifier in the melody database,
wherein the processor is further configured to:
traverse the piece of user unaccompanied-singing audio data to obtain the second pitch information;
perform note onset detection on the piece of user unaccompanied-singing audio data to obtain note onset timing information corresponding to the second pitch information as the second timing information, the note onset timing information being obtained by
determining the note onset timing information based on time and intensity informatio: of frequency sub-bands of the piece of user unaccompanied-singing audio data; and
combine the second pitch information and the note onset tinting information into the second melody information.

8. The server according to claim 7, wherein the processor is further configured to, before the second melody information corresponding to the song identifier is extracted
determine whether the piece of user unaccompanied-singing audio data associated with the song identifier from the user unaccompanied-singing audio data set meets one or more filtering-out criteria, wherein the one or more filtering-out criteria further includes:
the piece of user unaccompanied-singing audio data being an €ncomplete rendition of the song;
the piece of user unaccompanied-singing audio data being identified as a rendition of the song recorded without using a headset for feeding a corresponding instrumental accompaniment; or
the piece of user unaccompanied-singing audio data being determined as including noise or the corresponding instrumental accompaniment.

9. The server according to claim 7, wherein the processor is further configured to:
divide the piece of user unaccompanied-singing audio data into components of the frequency sub-bands by using a filter; and
for a corresponding component of each frequency sub-band of the frequency sub-bands,
extract an amplitude contour,
calculate a first-order relative difference function based on the amplitude contour,
extract a local maximum value of the first-order relative difference function as a note onset component, and
estimate conesponding time and corresponding intensity of the note onset component.

10. The server according to claim 7, wherein the processor is further configured to:
obtain an audio data set used for providing a music service;
extract, according to the audio data set, third melody information corresponding to the song identifier; and
store the third melody information in association with the song identifier in the melody database.

11. The server according to claim 10, wherein the processor is further configured to:
traverse a piece of audio data that corresponds to the song identifier from the audio data set to obtain a main-melody pitch contour of the traversed piece of audio data;
merge pitch values in the main-melody pitch contour within respective time intervals that are defined according to a fixed time length to obtain merged pitch information and corresponding note onset timing information; and
combine the merged pitch information and the conesponding note onset timing information into third melody information corresponding to the song identifier.

12. The server according to claim 7, wherein the processor is further configured to:
- receive a piece of humming feature data;
- determine similarities between the piece of humming feature data and pieces of melody information in the melody database;
- identify one or more pieces of melody information that correspond to the determined similarities greater than a preset similarity threshold;
- obtain one or more song identifiers corresponding to the identified one or more pieces of melody information; and
- generate a humming recognition result according to the obtained one or more song identifiers.

13. A non-transitory computer-readable storage medium storing computer-readable instructions, the computer-readable instructions, when executed by one or more processors, causing the one or more processors to perform:
- receiving a piece of Musical Instrument Digital Interface (MIDI) data corresponding to a song;
- obtaining a song identifier of the song;
- generating first melody information according to the MIDI data, the first melody information including first pitch information and first timing information corresponding to the first pitch information;
- storing the first melody information in association with the song identifier in melody database;
- receiving a riser unaccompanied-singing audio data set that is uploaded from one or more riser terminals;
- extracting, according to a piece of user unaccompanied-singing audio data that is from the riser unaccompanied-singing audio data set and associated with the song identifier, second melody information, the second melody information including second pitch information and second timing information corresponding to the second pitch information, and
- storing the second melody information in association with the song identifier in the melody database,
- wherein the extracting the second melody information comprises:
  - traversing the piece of user unaccompanied-singing audio data to obtain the second pitch information;
  - performing note onset detect on the piece of user unaccompanied-singing audio data to obtain note onset timing information corresponding to the second pitch information as the second timing information, including
    - determining the note onset timing information based on time and intensity information of frequency sub-bands of the piece of user unaccompanied-singing audio data; and
  - combining the second pitch information and the note onset timing information into the second melody information.

14. The non-transitory computer-readable storage medium according to claim 13, wherein the stored computer-readable instructions, when executed by the one or more processors, further cause the one or more processors to perform, before the extracting the second melody information corresponding to the song identifier:
- determining whether the piece of user unaccompanied-singing audio data associated with the song identifier from the user unaccompanied-singing audio data set meets one or more filtering-out criteria, wherein the one or more filtering-out criteria further includes:
  - the piece of user unaccompanied-singing audio data being an incomplete rendition of the song;
  - the piece of user unaccompanied-singing audio data being identified as a rendition of the song recorded without using a headset for feeding a corresponding instrumental accompaniment; or
  - the piece of user unaccompanied-singing audio data being determined as including nise or the corresponding instrumental accompaniment.

15. The non-transitory computer-readable storage medium according to claim 13, wherein the stored computer-readable instructions, when executed by the one or more processors, further cause the one or more processors to perform:
- obtaining an audio data set used for providing a music service;
- extracting, according to the audio data set, third melody information corresponding to the song identifier: and
- storing the third melody information in association with the song identifier in the melody database.

16. The non-transitory computer-readable storage medium according to claim 15, wherein the extracting, according to the audio data set, the third melody information corresponding to the song identifier comprises:
- traversing a piece of audio data that corresponds to the song identifier from the audio data set to obtain amain-melody pitch contour of the traversed piece of audio data;
- merging pitch values in the main-melody pitch contour within respective time intervals that are defined according to a fixed time length to obtain merged pitch information and corresponding note onset timing information; and
- combining the merged pitch information and the corresponding note onset timing information into third melody information corresponding to the song identifier.

17. The non-transitory computer-readable storage medium according to claim 13, wherein the stored computer-readable instructions, when executed by the one or more processors, further cause the one or more processors to perform:
- receiving a piece of humming feature data;
- determining similarities between the piece of humming feature data and pieces of melody information in the melody database;
- identifying one or more pieces of melody information that correspond to the determined similarities greater than a preset similarity threshold;
- obtaining one or more song identifiers corresponding to the identified one or more pieces of melody information; and
- generating a humming recognition result according to the obtained one or more song identifiers.

18. The non-transitory computer-readable storage medium according to claim 13, wherein the performing the note onset detection further comprises:
- dividing the piece of user unaccompanied-singing audio data into components of the frequency sub-bands by using a filter; and
- for a corresponding component of each frequency sub-band of the frequency sub-bands,
  - extracting an amplitude contour,
  - calculating a first-order relative difference function based on the amplitude contour, extracting a local maximum value of the first-order relative difference function as a note onset component, and estimating corresponding time and corresponding intensity of the note onset component.

* * * * *